United States Patent [19]

Amari et al.

[11] Patent Number: 5,389,332

[45] Date of Patent: Feb. 14, 1995

[54] HEAT RESISTANT CONTAINER MOLDING METHOD

[75] Inventors: Fumiya Amari; Tosimichi Takeuchi, both of Komoro, Japan

[73] Assignee: Nissei ASB Machine Co., Ltd., Nagano, Japan

[21] Appl. No.: 21,585

[22] Filed: Feb. 24, 1993

[30] Foreign Application Priority Data

Feb. 29, 1992 [JP] Japan .................................. 4-078820
Jan. 29, 1993 [JP] Japan .................................. 5-034792

[51] Int. Cl.⁶ ........................ B29C 49/12; B29C 49/18
[52] U.S. Cl. ..................................... 264/530; 264/534; 264/526; 425/526; 425/529
[58] Field of Search ................ 264/519, 520, 521, 530, 264/531, 532, 534, 230, 342 R; 425/526, 529; 204/526

[56] References Cited

U.S. PATENT DOCUMENTS

| | | | |
|---|---|---|---|
| 4,177,239 | 12/1979 | Gittner et al. | 264/529 |
| 4,233,022 | 11/1980 | Brady et al. | 264/520 |
| 4,260,567 | 4/1981 | Poppe et al. | 264/519 |
| 4,385,089 | 5/1983 | Bonnebat et al. | 264/529 |
| 4,701,121 | 10/1987 | Jakobsen et al. | 264/520 |
| 4,704,243 | 11/1987 | Nilsson et al. | 264/534 |
| 4,836,971 | 6/1989 | Denis et al. | 264/530 |

FOREIGN PATENT DOCUMENTS

| | | |
|---|---|---|
| 0155763 | 9/1985 | European Pat. Off. . |
| 0237459 | 9/1987 | European Pat. Off. . |
| 0425360 | 2/1991 | European Pat. Off. . |
| 425360 | 5/1991 | European Pat. Off. . |
| 2239332 | 2/1975 | France . |
| 58-56828 | 4/1983 | Japan . |
| 3-205124 | 9/1991 | Japan . |
| 3-234520 | 10/1991 | Japan . |

*Primary Examiner*—Catherine Timm
*Attorney, Agent, or Firm*—Oliff & Berridge

[57] ABSTRACT

In a method of molding a heat resistant container whose bottom has an inwardly raised part, firstly a preform is primary blow molded to form a primary blow molded article which is greater at least in length than the container to be obtained as a final product. Then the primary blow molded article is heat shrunk. This heat shrinking is restricted in such a manner that the length of the heat shrunk primary blow molded article from its top to its bottom center is greater than the length of the final product from its top to a peak of the raised part. Then at least the central region of the bottom of the heat shrunk primary blow molded article is inwardly pushed within a secondary blow cavity mold having a bottom mold by vertically moving the bottom mold. Finally in the secondary blow cavity mold, the resulting product is secondary blow molded so that the heel of a heat resistant container, as the final product, has a desired thickness.

10 Claims, 14 Drawing Sheets

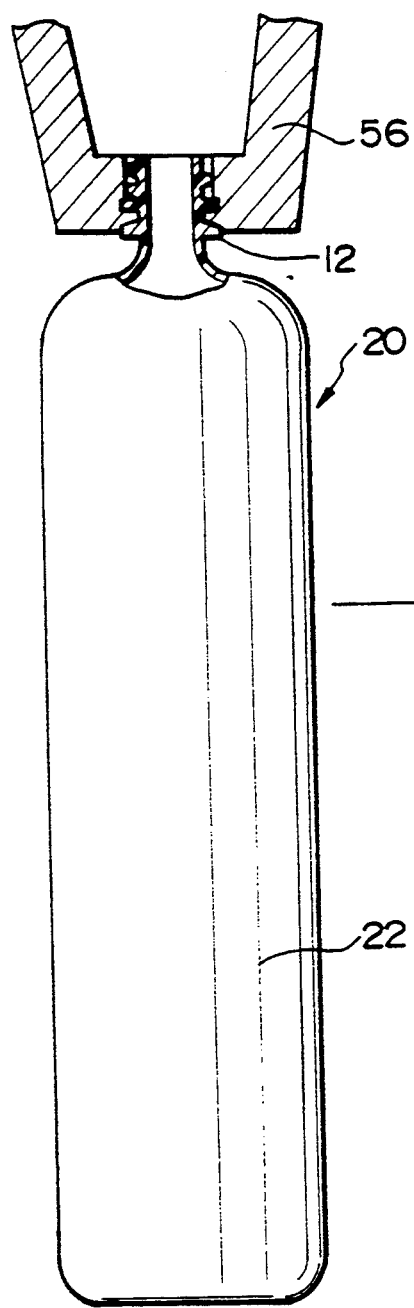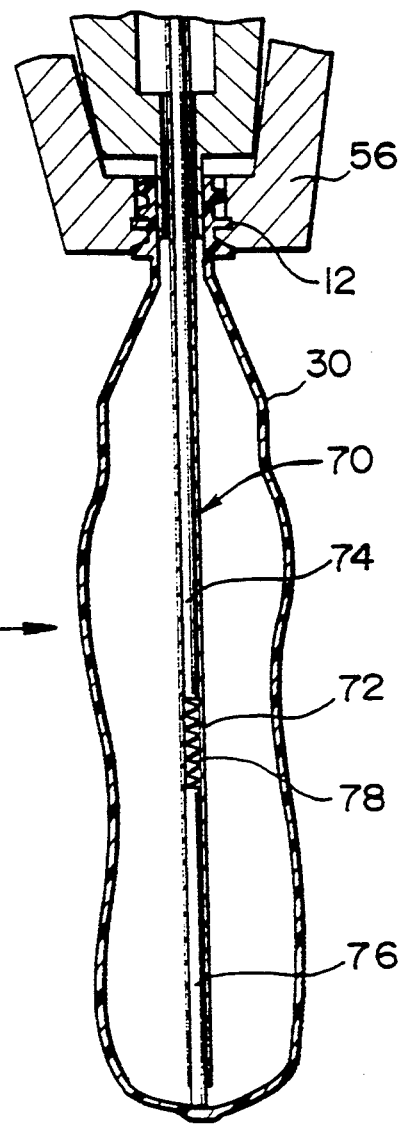
FIG. 4a
FIG. 4b

HEAT RESISTANT CONTAINER MOLDING METHOD

BACKGROUND OF THE INVENTION

1. Field of the Invention

The present invention relates to a molding method for obtaining a heat resistant container by putting a preform through a primary blow molding manufacturing step, a heat shrinking manufacturing step and a further secondary blow molding manufacturing step, whereby the lower region of this container retains the desired heat resistant characteristics.

2. Description of the Related Art

In, for example, U.S. Pat. No. 4,836,971, the following kind of technology for producing a heat resistant container is disclosed. An injection molded heated preform is primary blow molded into a primary blow molded article, which is longer than the final molded article. This is then reduced by heat shrinking to a length and width which is smaller than the final molded container. This smaller container is then secondary blow molded into a heat resistant container.

However, the aforementioned way of molding a bottle does not take into account the fact that the lower region needs to have both a strong resistance to being dropped and be heat resistant.

The present inventors have found the reason why such a bottle is weak in a drop impact is that wall thickness of a region of a bottle referred to as a heel is formed relatively thin.

This designated heel region ranges from the base formed from the outside edge of the bottom to the raised region. This heel region is the last region to arrive at the inner cavity surface of the secondary blow molding cavity when the heat shrunk molded article is secondary blow molded. That is to say that the sidewall part of the heel region which is just up from the heel region will make contact with the cavity wall before the heel does. Also, more particularly, when the raised shape of the bottom is concave, as with a champagne bottle, the bottom inner walls of this heel part will also make contact with the cavity wall before the heel part does. Also, the resin material which comes into contact with the cavity wall becomes more difficult to stretch afterwards. As a result of this, when the region corrosponding to the heel is then blow molded, this heel region will be thinner than the corrosponding wall regions.

If a load is then applied, for example, during a drop test, the heel could change shape or could collapse completely. Any change in the heel shape would be markedly detrimental to the bottles heat resistance and self-standing ability. Also, if the heel of the bottle was thin, this problem could be caused simply by applying pressure by hand.

The problem of the lower part of the bottle having a low resistance to heat occurs because of the comparatively wide scope of the low stretched region, but this will be cleared up by the present invention.

The low stretched region is formed during the primary blow molding process and already in the bottom portion of the primary molded article. If this primary blow molding article is put through a secondary blow molding manufacturing step after it has been heat shrunk, the low stretched region formed in the primary blow molded article will be more easily stretched than other regions. As a result of this the low stretched region will spread into a comparatively large area of the lower region of the secondary blow molded article. However, the stretch ratio during the secondary blow molding process is substantially lower than that during the primary blow molding process. This means that even if this low stretched region is stretched during the secondary blow molding process, its orientation will still be low when compared to other regions so its resistance to heat will be poor.

SUMMARY OF THE INVENTION

It is therefore an object of this invention to employ primary and secondary blow molding manufacturing steps to provide a heat resistant container of which lower region has the desired characteristics Another object of the invention is to provide a molding method for a heat resistant container whereby; there is an inwardly facing convex shaped raised lower section formed within the lower part of the heat resistant container; the heel part of this container is formed to the desired thickness; the container is resistant against pressure if dropped and; the container is sufficiently self-standing.

A further object of the invention is to provide a molding method which produces a container which has attained a high resistance to heat by substantially reducing the extent to which the low stretched region formed at the center of the lower region during the primary blow molding process expands in the secondary blow molding process.

According to a first aspect of the invention, there is provided a method of molding a heat resistant container whose bottom has an inwardly raised part, comprising the steps of:

(a) primary blow molding an injection molded preform into a primary blow molded article, which is longer at least axially than the heat resistant container as a final molded product in a primary blow cavity mold;

(b) heat shrinking the primary blow molded article in such manner that the length of the heat shrunk primary blow molded article from its top to its bottom center is greater than that of the container, as the final molded product, from its top to a peak of the raised part;

(c) forming inwardly at least a central region of the bottom of the heat shrunk primary blow molded article within a secondary blow cavity mold having a vertically movable bottom mold by vertically moving the bottom mold; and (d) secondary blow molding the heat shrunk primary blow molded article into the heat resistant container within the secondary blow cavity mold.

With this method, the primary blow molded article will be longer after it has been heat shrunk than the length of the final molded product measured down to the peak of its lower raised part. In this way, before the secondary blow molding manufacturing step a bottom mold can be raised up toward the lower part of the primary blow molded article after it has been heat shrunk. This will force at least the low stretched part of the central portion up into a concave shape. By doing this, it can be accomplished to shorten the difference between the time it takes for the heel part to make contact with the cavity wall and the time it takes for both of the sidewalls and the base to make contact with the cavity wall when the heat shrunk molded article is secondary blow molded in the secondary blow molding cavity. Whereas before the heel was comparatively thin when compared to the sidewalls, it can now be made thick. The heel of the container will therefore have a much greater resistance to being dropped.

As it is advisable to try to control the degree of vertical shrinking when the primary blow molded article is heat shrunk, a restricting rod is fed through into the primary blow molded article, the front end of which will make contact with the lower wall of the container. It is also preferable to have a spring within the rod so that the front end of the rod can move. When the primary blow molded article is being heat shrunk, this rod then helps to guide and center the article as it shrinks by maintaining contact with its lower inner wall and, as the rod has a spring, contracting slightly along with the container. As the shrinking force of the primary blow molded article will not exceed the reactive force of the spring, the vertical shrinking will be controlled. This rod has a dual purpose in that it also serves to center the heat shrunk molded article in the secondary blow molding manufacturing process.

There are various ways in which the degree to which the primary blow molded article shrinks can be controlled. For example, air could be blown into the primary blow molded article or its orifice could be sealed. Either of these would increase its internal pressure and when combined with the rod would provide adequate shrinking control.

The degree to which the primary blow molded article shrinks in the vertical direction can also be controlled by reducing the vertical shrinkage for the shrinking process. This can be done, for example, either by keeping the temperature of the preform before the primary molding process between 85° C. and 100° C. or by keeping the temperature of the primary blow molded article between 70° C. and 80° C. by applying a kind of heating means to the primary blow cavity mold.

According to a second aspect of the invention, there is provided a heat resistant container molding method comprising the steps of:

(a) primary blow molding an injection molded preform into a primary blow molded article, which is longer at least longitudinally than the heat resistant container as a final molded product and whose bottom has a less-stretched region lower in stretch ratio than that of its body part in a primary blow cavity mold;

(b) heat shrinking said primary blow molded article;

(c) cooling said less-stretched region of the bottom of said heat shrunk primary blow molded article; and (d) secondary blow molding said heat shrunk and cooled primary blow molded article into the heat resistant container within a secondary blow cavity mold, whereby the less-stretched region of the bottom is less expanded.

With this method, the low stretched region formed in the lower part of the primary blow molded article is cooled before the secondary blow molding manufacturing step. This makes it difficult to stretch, so that when it undergoes the secondary blow molding manufacturing step it only extends slightly, thus it will retain a great deal of its resistance to heat.

The cooling manufacturing step for this low stretched region is as follows. There is a lower mold arranged at the lower part of the blow moving cavity, and it is possible to move this mold upwards. Before the start of the secondary blow molding process, this lower mold is moved upwards so as to form an upwardly facing concave shape at least within the low stretched region in the lower part of the primary blow molded article. This mold is held in contact with the primary blow molded article for a fixed period of time so as to induce cooling, at which time a coolant may be circulated about the lower mold.

When cooling using a lower mold it is necessary to control the vertical shrinking of the primary blow molded article during the heat shrinking process. This is preferably achieved by using the rod along with the control of the internal air pressure or by reducing the shrinkage of the resin body by controlling the temperature of the intermediate molded article.

It is preferably for the cooling of the low stretched region to take place somewhere outside the secondary blow molding station. It would be preferable, for example, to have coolant ejected onto the low stretched region, or press the low stretched region onto a cooling block before the heat shrunk molded article is carried into the secondary station.

BRIEF DESCRIPTION OF THE DRAWINGS

FIG. 4 is a diagram illustrating the heat shrinking step when applied to a primary blow molded article;

DETAILED DESCRIPTION

First Embodiment

Figure 1:
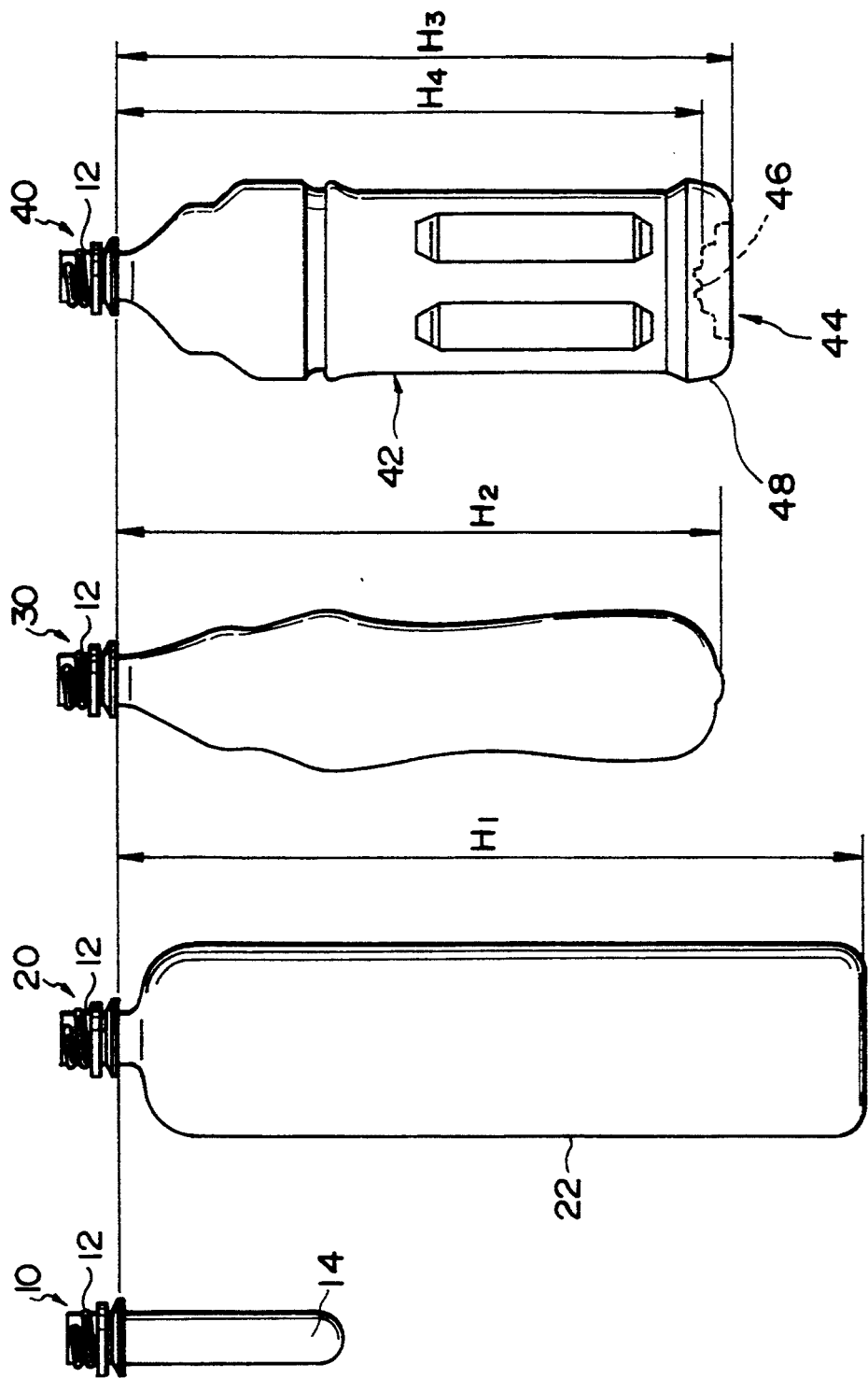
FIG. 1 is a view illustrating individual main manufacturing steps involved in producing a molded article for a first embodiment of the present invention.

FIG. 1 shows the different forms which a heat resistant container takes at the main production stages in this embodiment. These include a preform 10, a primary blow molded article 20, a heat shrunk molded article 30 and a secondary blow molded article 40, which will become the heat resistant container.

Figure 2:
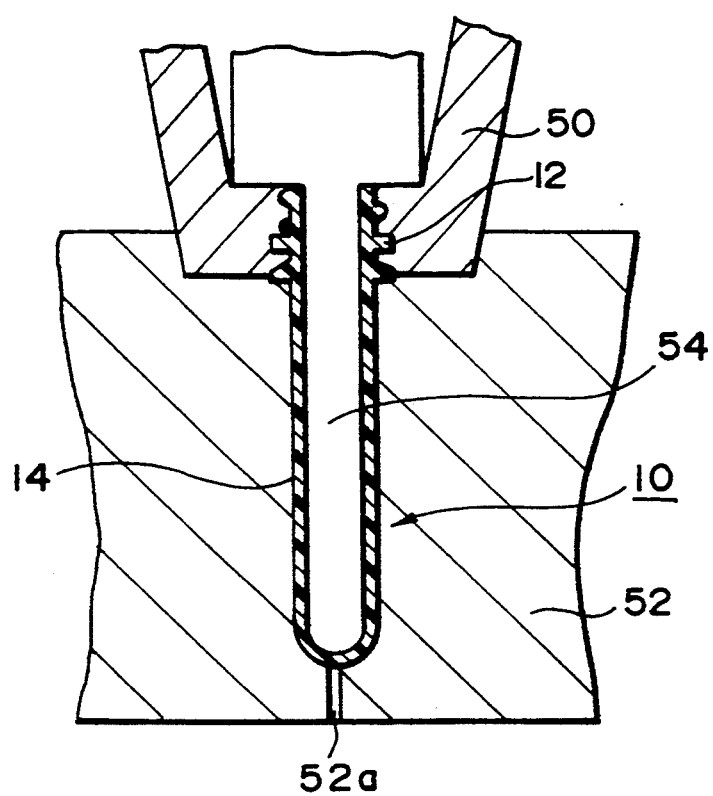
FIG. 2 is a fragmentary cross-sectional view of a mold for injection molding a preform.

Firstly, an injection mold shown in FIG. 2 which is used to form the preform 10 will be described. This preform has a central hollow body consisting of a lower cylindrical body 14 and a neck 12. There is a neck mold 50 which closes against the outer surfaces of the neck 12 which can be horizontally opened and closed. An injection cavity mold 52 also encompasses the outer wall surface of the body 14. A core mold 54 then encompasses the surface of the inner wall of the preform 10. A resin of, for example, polyethylene terephthalate (hereinafter referred to as PET) is then injected via a gate 52a at the center of the bottom portion of the injection cavity mold 52 into the hollow to form the preform 10. The neck mold 50 is then used to carry the preform to the next manufacturing step.

Figure 3:
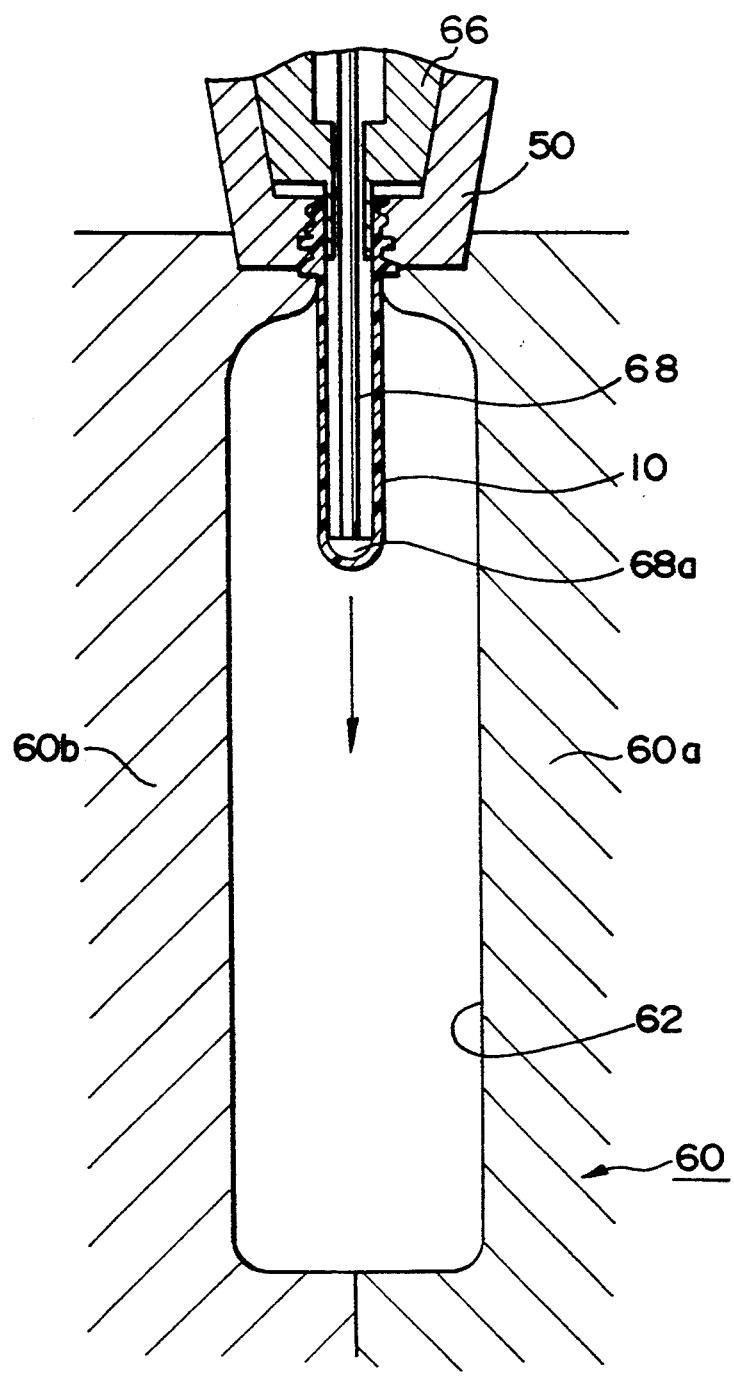
FIG. 3 is a fragmentary cross-sectional view of a mold for a primary blow molding step.

The preform is then carried by the neck mold 50 to a separate area which is not shown in the diagrams where it is temperature adjusted to a temperature which is suitable for the stretched process. It is then carried to a further primary blow molding area which is shown in FIG. 3, where it is molded into the primary blow molded article 20 which is shown in FIG. 1.

This primary blow molded article 20 now consists of a neck 12 molded by the previous manufacturing step and a lower tubular shaped body 22. It is also blow molded to a height H1 which is, for example, 30% taller than the height H3 of the second blow molded article 40 which is used as the final molded article. It is also preferable if its external diameter is greater than that of the secondary blow molded article 40.

The blow mold used to produce this primary blow molded article 20 shown in FIG. 3 will now be described. A primary blow cavity mold 60 is formed from a pair of molds 60a and 60b which can be horizontally opened and closed. There is also a blow core mold 66 which can be inserted through the neck 12 and a stretch rod 68 which can be operative vertically along the blow core mold 66. The shape of the primary blow molded article 20 is then defined by the cavity surface 62 of the primary blow cavity mold 60.

The preform 10 is stretched both horizontally and vertically into the shape of the primary blow molded article 20 by blow molding it in the following manner. The stretched rod 68 is repeatedly lowered downwards so as an end piece 68a at its lower end repeatedly makes contact with the inside surface of the lower wall of the preform 10, thus the stretched rod 68 extends the preform 10 vertically and also provides centering for this stretched process. At the same time, pressurizing fluid such as air is blown into the preform 10 via the blow core mold 66 so as to stretch the preform horizontally. The primary blow molded article 20 can be then heated by a heating means arranged in the cavity mold 60 while the outer surface of the primary blow molded article 20 is still in contact with the cavity surface 62, and be then kept at an adjusted temperature for a fixed period of time.

The primary blow molded article 20 is then, for example, released from the neck mold 50 and then supported by a supporting means 56 shown in FIG. 4, so as it can undergo the heat shrinking manufacturing process. The shrinkage of the primary blow molded article 20 is embodied by placing in, for example, an atmosphere heated in an oven. To undergo this heat shrinking process the body 22 of the primary blow molded article 20 is heated to a temperature of between 180° and 220° C., for example, for a predetermined period of time. As a result, the primary blow molded article 20 is shrunk both horizontally and vertically and thus becomes the heat shrunk molded article 30. This change is shown in FIG. 4. In order to control shrinking it is best to keep the internal pressure of the molded article constant by blowing air in, for example, or sealing the opening of the molded article. Another approach would be to insert a rod to restrict vertical shrinking.

In the heat shrinking manufacturing step shown in FIG. 4 a rod 70 is used. There are two rods inserted into the hollow external tube part 72 of this rod 70. The upper first rod 74 is fixed, while the lower second rod 76 is biased to move downward by the spring 78. The second rod 76 will make contact with the inner surface of the lower wall of the primary blow molded article 20 and will therefore limit the degree to which it shrinks in the vertical direction. The rod 70 will also help to center the heat shrunk molded article 30.

This restricting rod 70 in this embodiment serves two functions in that it also acts as a centering rod for the secondary blow molding step in the second manufacturing step. In order to do this the restricting rod 70 is inserted into a secondary blow core mold 84 to be used in the secondary blowing molding process, and the restricting rod 70 and the blow core mold 84 are then placed together inside the primary blow molded article 20 before the heat shrinking manufacturing step. Alternative ways in which the degree to which the heat shrinking process in the heat shrunk molded article 30 is limited would then be as follows. The restricting rod 70 could be used together. Otherwise, the blow core mold 84 could be tightly closed and the opening in the primary blow molded article 20 to be heat shrunk could be sealed. Then the internal pressure inside the heat shrunk molded article 30 resulting from the heat shrinking could be increased to restrict heat shrinkage.

Figure 5:
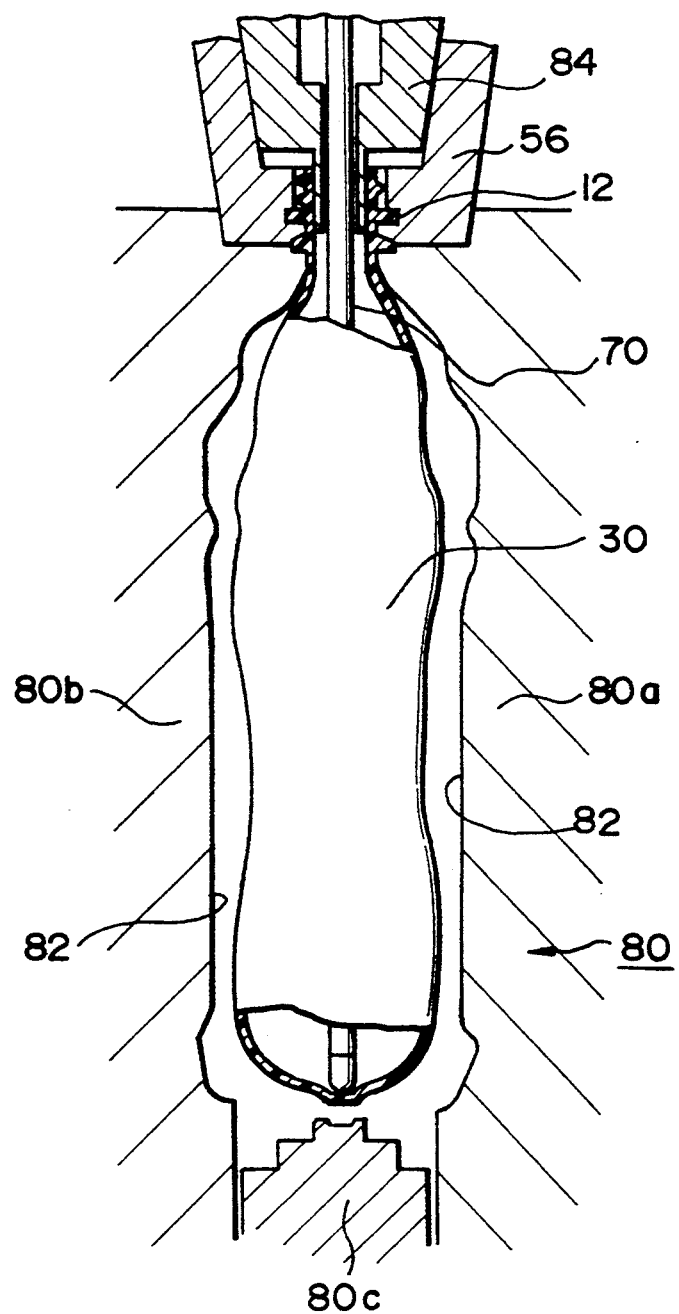
FIG. 5 is a fragmentary cross-sectional view of a mold for the secondary blow molding step.

Next, the heat shrunk molded article 30 is carried by the supporting means 56 in order to go through the final molding manufacturing step, which is the secondary blow molding step shown in FIG. 5. Here, a secondary blow molded article 40 which has a neck 12 and a lower body 42 of length H3 is molded.

The blow mold used to produce this secondary blow molded article 40 shown in FIG. 5 will now be described. A secondary blow cavity mold 80 is formed from a pair of molds 80a and 80b which can be horizontally opened and closed and a further bottom mold 80c which is vertically movable. There is also a blow core mold 84 and a restricting rod 70 which have been inserted through the neck 12. The shape of the secondary blow molded article 40, that is to say the final molded product, is defined by the cavity surface 82 of the secondary blow cavity mold 80.

Figure 6:
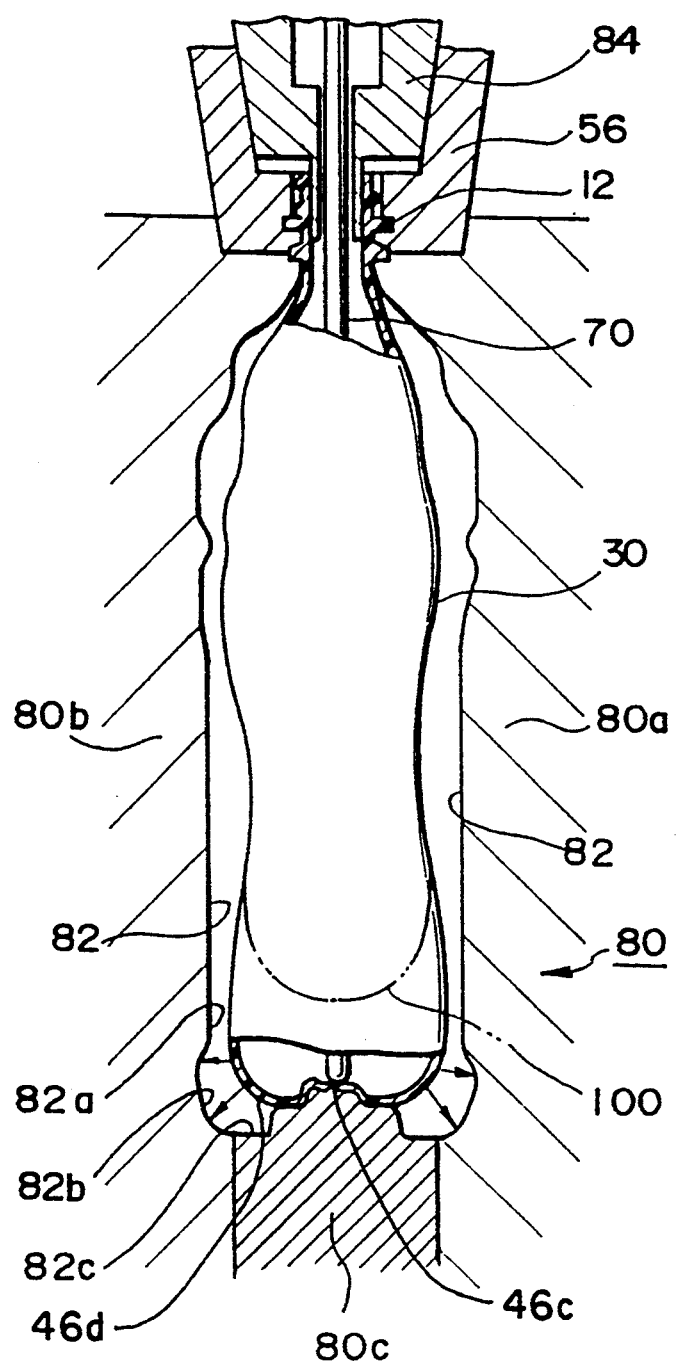
FIG. 6 is a fragmentary cross-sectional view of the lower mold which thrusts upwards into the secondary blow cavity mold.
Figure 7:
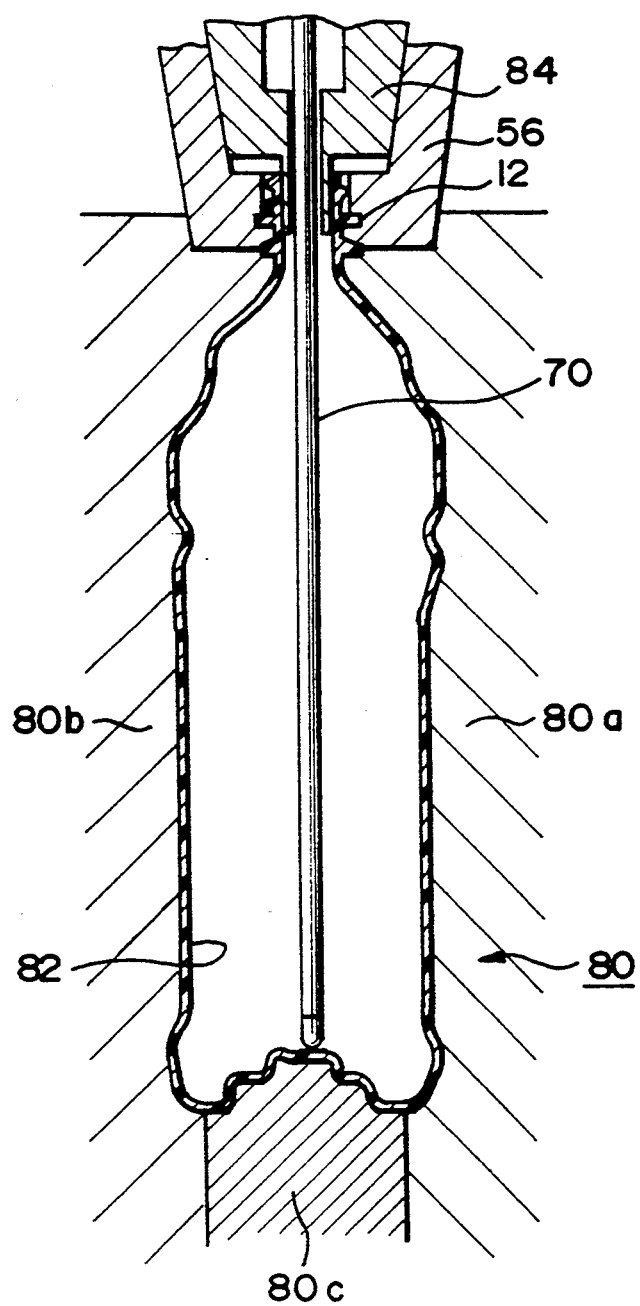
FIG. 7 is a fragmentary cross-sectional view illustrating a secondary blow molding manufacturing step.

Next, this secondary blowing step is described with the aid of FIGS. 5 to 7.

In FIG. 5, the heat shrunk molded article 30 is shown inside the secondary blow cavity mold 80, the molds 80a and 80b are shown in their closed position and the restricting rod 70 is shown touching approximately the center of the lower section of the heat shrunk molded article 30. By referring to FIG. 1 it can be seen that the heat shrunk molded article 30 of length H2 is longer than the length H4 taken from the peak of the raised portion 46 of the secondary blow molded article 40, that is to say the final molded product. When the molds 80a and 80b are closed, the bottom mold 80c is ready below accordingly.

FIG. 6 shows the part of the manufacturing process where the bottom mold 80c is moved upwards. This upward movement causes the bottom portion of the heat shrunk molded article 30 to be moved upwards, which in turn causes the corresponding raised portion 46 of the secondary blow molded article 40 to be shaped. As shown in FIG. 6, the bottom mold 80C contacts a central raised region or central part 46c of the raised portion 46. The part of the heat shrunk molded article 30 which is to be the heel part 48 of the final molded product 40 is not yet making contact with the corresponding parts of the cavity molds 80a, 80b and 80c at this time. Additionally, as shown in FIG. 6, part of the heat shrunk molded article corresponding to an inwardly raised part does not contact either the bottom mold 80c or the cavity molds 80a and 80b. This part of the raised portion 46 is an edge part 46d. In this embodiment the bottom mold 80c is moved up as far as possible. Moving the bottom mold 80c part of the way up would also give satisfactory results. The point in raising the bottom mold 80c before the secondary blow molding manufacturing step is that more inner region of the lower part than that corrosponding to the heel 48 of the final molded article makes sufficient contact with the bottom mold 80c.

Finally, the secondary blow molding manufacturing step shown in FIG. 7 will be discussed.

In this secondary blow molding manufacturing step, pressurizing fluid such as air is blown in via the blow core mold 84 while the lower end of the restricting rod 70 is kept contact with the lower inside wall of the heat shrunk molded article 30. By carrying out this blow molding process, the heat shrunk molded article 30 is stretched in the horizontal direction in such a way that the shapes of a lower body 42, a bottom 44 and a heel part 48 are defined by the cavity surface 82 of the secondary blow cavity mold 80.

After the preform molding step there is a primary blow molding step, a heat shrinking step and a secondary blow molding step. If the final molded product obtained by going through all these steps is then compared with a container which was obtained by going through only one blow molding step, it is found that the degree of stretched during the primary blow molding is higher than usual. In addition to this, there is a high degree of crystallization due to the fact that the crystal defects present in the primary blow molded article 20 are removed by the heat shrinking manufacturing step. Also, since the molded product is subjected to severe temperatures in the following manufacturing step it is known that the high crystallization realizes a container being mechanically resistant and heat resistant.

According to this embodiment, as is shown in FIG. 6, the distances between the surface of the outer wall of the heat shrunk container 30 and the sidewall mold region 82a, heel mold region 82b and the base mold region 82c are approximately the same. It is apparent that this is not the case for the related art, of which the lower region 100 is indicated by the dash-and-dotted lines in FIG. 6. When the pressurizing air is then blown in during the secondary blow molding manufacturing step, the outer wall surface of the heat shrunk molded article 30 comes into contact with each of the mold regions 82a to 82c at approximately the same time. This means that the heel part 48 of the final molded article 40 will not be extremely thinner than the body 42.

Next, the relationship between the adjusted temperature of the preform 10, the adjusted temperature of the primary blow cavity mold 60, and the shrinking along the vertical axis of the heat shrunk molded article 30 will be considered. In the aforementioned embodiment, a restricting rod 70 and air were used to restrict the shrinking of the molded article 30 in the vertical direction. However, it would also be possible to restrict this shrinking by controlling the temperature of the intermediate molded article. This could be done either in place of or in tandem with the rod and air method. As an example of this, when experimenting with regards to this invention it was found that if the adjusted temperature of the preform 10 before the primary blow molding step was made high, this would in turn reduce the degree to which the primary blow molded article 20 would be shrunk during the heat shrinking process.

Figure 8:
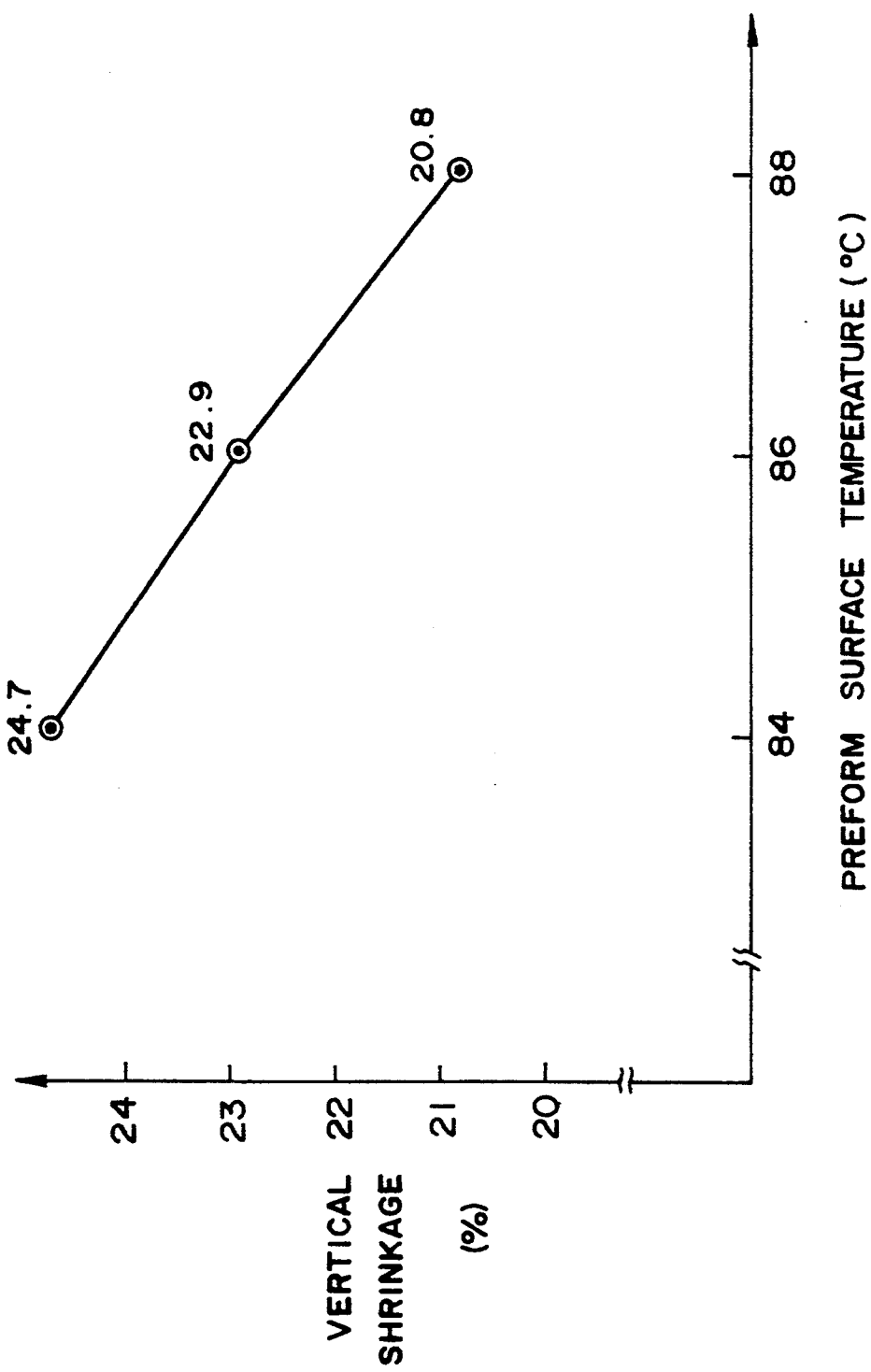
FIG. 8 is a graph showing the relationship between the surface temperature of the preform and the shrinkage of the heat shrunk container.

FIG. 8 shows the relationship between the surface temperature of the preform 10 and the shrinkage. The graph shown in FIG. 8 was obtained under the following experimental conditions. The material used as the resin was Eastman 7352 (a trade name). The adjusted temperature of the primary blow cavity mold 60 was 50° C. The applied temperature during the heat shrinking manufacturing step was 230° C. The period of time for which this heat was applied was 30 seconds and during the heat shrinking step, air was forced into the container 20 to a pressure of 0.32 kg/cm$^2$. It becomes clear from the diagram that the shrinkage of the container 30 will decrease as the surface temperature of the preform 10 is increased.

Figure 9:
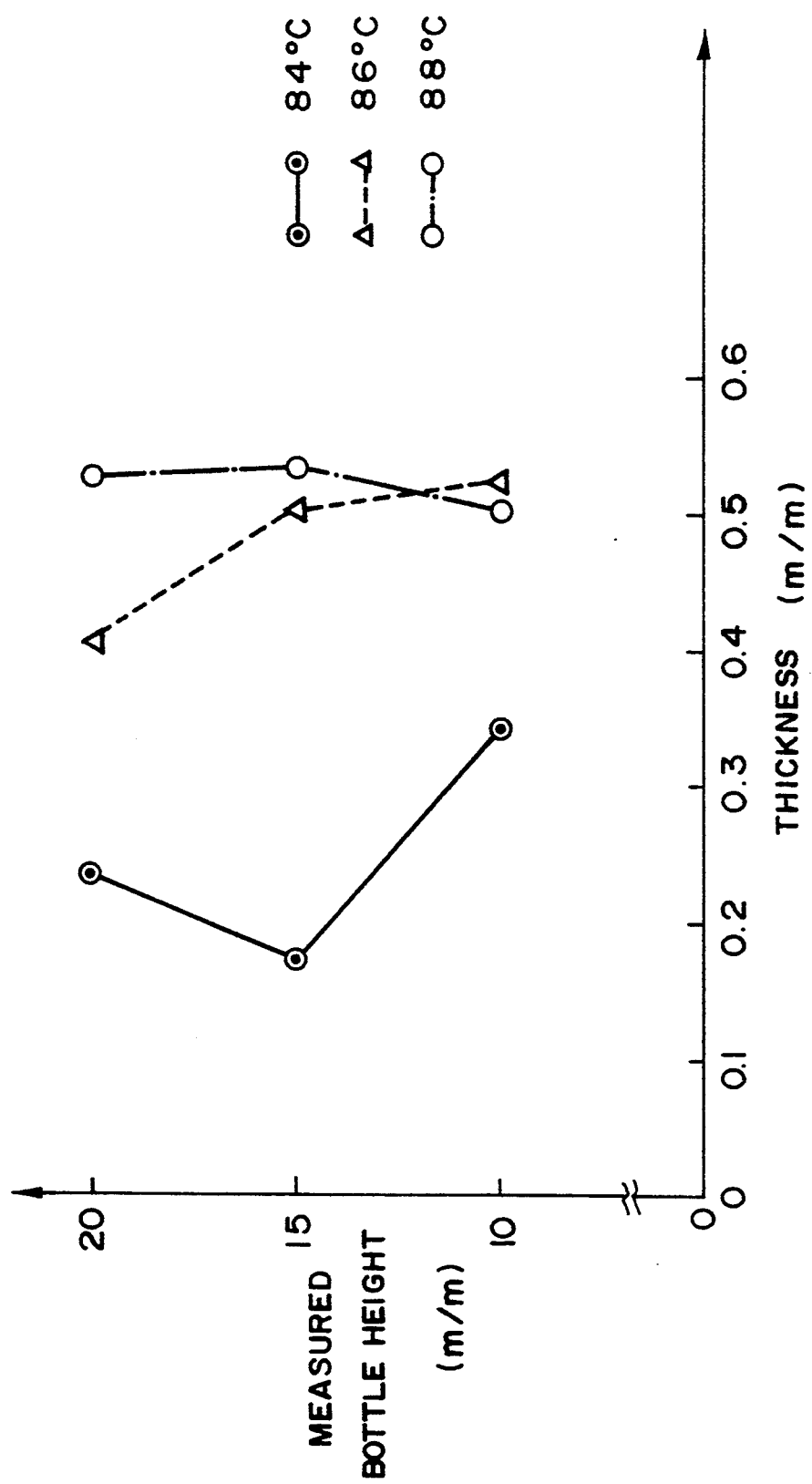
FIG. 9 is a graph showing the thicknesses of different parts of the heel for various preform adjusted temperatures.

FIG. 9 shows the relationship between the adjusted temperature of the preform 10 and the thickness of the heel part 48. The measurements of the thickness of the heel 48 are taken at intervals of 10 mm, 15 mm and 20 mm from the base surface. When the surface temperature of the preform 10 was made to be 84° C., the thickness of the heel 48 was found to be between 0.15 and 0.35 mm, which is relatively thin. On the other hand, when the surface temperature of the preform was made up to be 86° and 88° C., the thickness of the heel 48 was found to be around 0.5 mm at all three points, so it becomes apparent from the characteristics shown in FIG. 9 that a preform surface temperature of greater than 85° C. is preferable. Also, if a temperature of in excess of 100° C. is applied to provide the necessary stretched during the primary blow molding manufacturing step it becomes very difficult to get the desired thickness distribution from the body to the bottom. It is therefore preferable to have a preform 10 surface temperature of between 85° and 100° C. in order to get the heel to the desired thickness.

Figure 10:
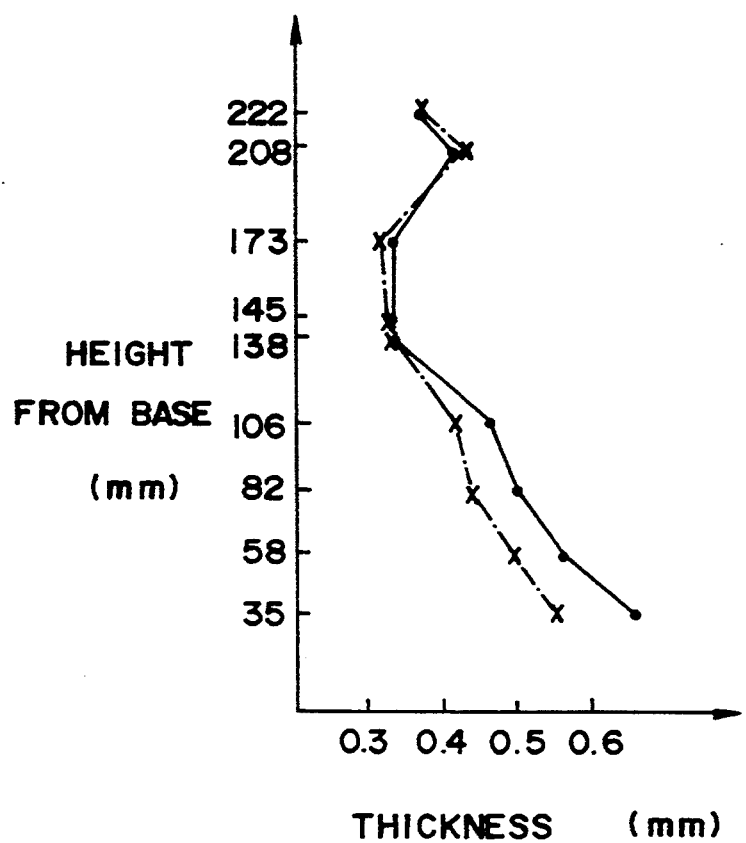
FIG. 10 is a graph showing how the thickness of the final molded product varies along its vertical axis for differing primary blow cavity mold surface temperatures.
Figure 11:
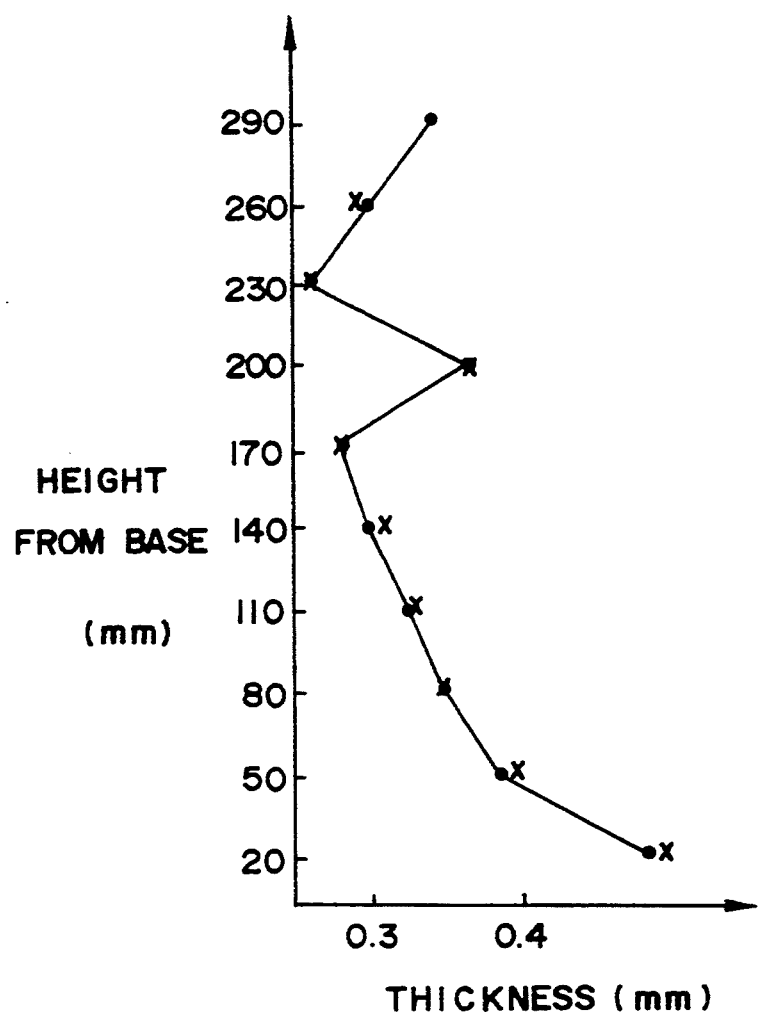
FIG. 11 is a graph showing how the thickness of the primary blow molded article varies along its vertical axis for differing primary blow cavity mold surface temperatures.

Next, the relationship between the thickness of the heel 48 of the final molded article 40 and the set temperature of the primary blow cavity mold 60 will be described. According to this invention, it is better to have the temperature of the primary blow cavity mold 60 set higher so as the shrinkage during the proceeding molded article shrinking process can be made smaller. FIG. 10 shows how the thickness of the final molded article 40 varies with height at various points as the adjusted temperature of the primary blow cavity mold 60 is changed. In this diagram, the solid line shows the thickness distribution when an adjusted temperature of the primary blow mold 60 is 75° C., while the dot-and-dash line shows the thickness distribution when the temperature is not adjusted. Now, it is apparent from FIG. 11, even if the temperature of the primary blow cavity mold changes, that the thickness of the primary blow molded article 20 will be the same. It is also known that the thickness of the heel 48 of the final product 40 can be adjusted by changing the temperature of the primary blow cavity mold 60. Also, if the surface temperature of the primary blow cavity mold 60 is set to 75° C., the lower walls of the secondary blow molded article 40 will be thick. Therefore, according to the present invention, in order to get a necessary degree of thickness at the various points in the heel 48 of the secondary blow molded article 40, it is preferable to have the surface temperature of the primary blow cavity mold 60 greater than 70° C., with a temperature of between 75° C. and 80° C.

The thermal shrinkage of the heat shrunk molded article 30 can be controlled by controlling the adjusted temperature of the preform 10 and the primary blow cavity mold 60 in the heat shrinking stap. It follows that if the lower part of the heat shrunk molded article 30 is placed in contact with the bottom mold 80c before the start of the secondary blow molding, the heel 48 will be thickly molded. Also, the easiest way to keep the lengthwise shrinkage of the molded article low is to either, select a suitable spring constant for the spring 78 which is installed in the restricting rod 70 to avoid breakthrough, or select a suitable pressure for the air which is blown into the molded article 30.

It would also be possible to adjust in preperation the thickness of the portion of the primary blow molded article 20 which corresponds to the heel region of the final molded product 40.

This invention should by no means be limited to the foregoing examples, and various modifications may be suggested without departing from the spirit of this invention. For example, the bottom 44 and heel 48 are not limited to the shape shown in FIG. 1. Various other shapes which can retain their self-supporting ability, pressure resistance and heat resistance are also suitable.

Second Embodiment

Next, with the aid of FIGS. 12 and 13, a further embodiment involving a method for making the raised portion 46 of the final molded product 40 heat resistant will be described.

In addition to the processes involved in the first embodiment, this second embodiment involves a further cooling step where the bottom of the heat shrunk molded article 30 is cooled. This cooling step takes place at a point in time after the bottom mold 80c has been raised and before the secondary blow molding process has started.

Figure 12:
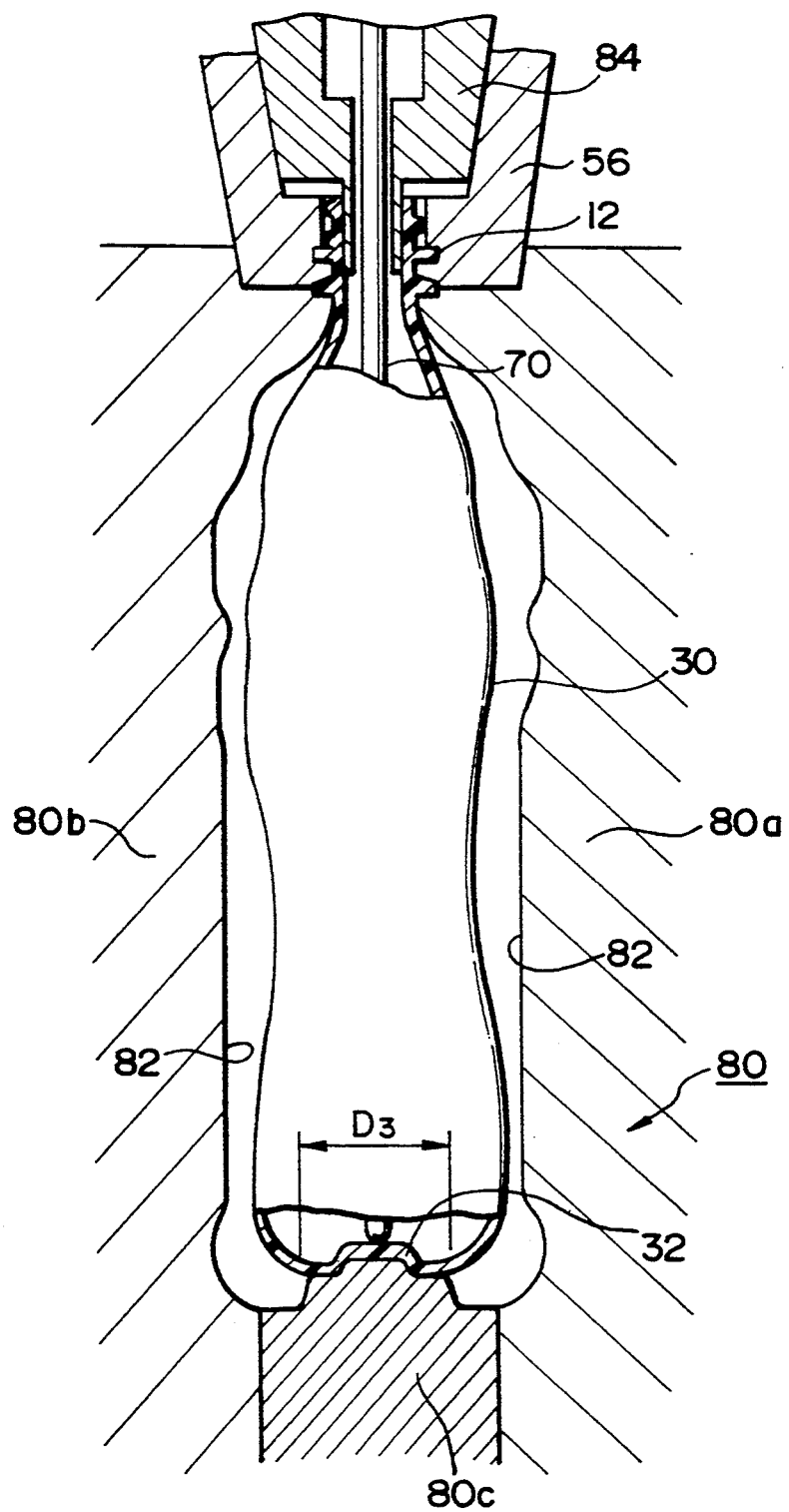
FIG. 12 is a fragmentary cross-sectional view of a cooling step in the manufacturing process applied to the lower stretched region for a second embodiment of the present invention.

The cooling manufacturing step for the bottom of the heat shrunk molded article 30 is shown in FIG. 12. In this step, the bottom mold 80c maintains the concave shape of the bottom of the container 30 until the start of the secondary blow molding process. The bottom mold 80c thus cools the bottom of the container 30 which is in contact with the bottom mold 80c. This cooling time period should be long enough to attain a temperature which will make it difficult to stretch that region during the secondary blow molding process, for example, somewhere between 1 and 10 seconds. It would also be advantageous to adjust the temperature of the bottom mold 80c to shorten the cooling time period.

The region which is cooled by the bottom mold 80c during this step is the central region 32 having a diameter indicated by D3 in FIG. 12. This region will have a lower degree of stretched than the other regions and will therefore be referred to as the low stretched region 32.

Figure 13A:
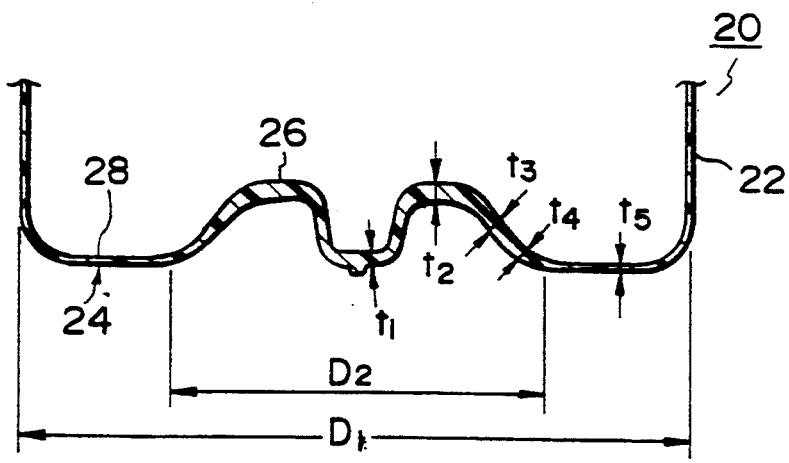
FIGS. 13a to 13c are fragmentary cross-sectional views showing the thickness of the lower part of the molded article at the respective main manufacturing steps for the second embodiment.
Figure 13B:
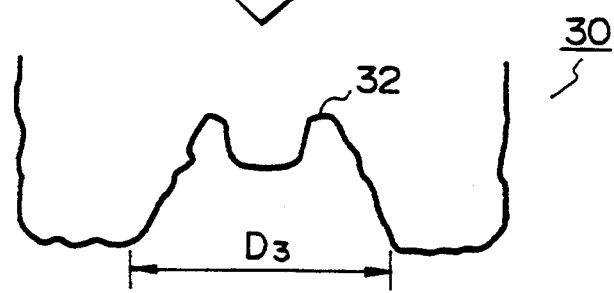

As can be seen from FIG. 13, the low stretched region 32 of the heat shrunk molded article 30 is actually a heat shrunk version of the primary low stretched region 26 which is at the center of the bottom of the primary blow molded article 20. The central region of the primary base 24 of the primary blow molded article 20 has a lower degree of stretched than other regions as it is pushed and guided by the end piece of the stretch rod 68 during the primary blow molding process. As a result of this, as shown in FIG. 13, a comparatively thick primary low stretched region 26 having a diameter D2 is formed at the lower region of the primary blow molded article 20 of external diameter D1.

In a primary blow molded article 20 where the external diameter D1 is, for example, 120 mm, the diameter of the primary low stretched region 26 will be within 60 mm. The thickness measured at various points within this region 26 will then be as follows.

$t1 = 1.2$ mm
$t2 = 2.4$ mm
$t3 = 1.0$ mm
$t4 = 0.6$ mm

The thickness of the high stretched region 28 outside the low stretched region 26 is then $t5 = 0.4$ mm.

When the heat shrinking process is applied to the primary low stretched region 26 of the primary base part 24 of the primary blow molded container this region becomes the low stretched region 32 of the heat shrunk molded article 30, and as such its diameter D3 will be smaller than the diameter D2 of the primary low stretched region 26.

As the low stretched region 32 of the heat shrunk molded article 30 is thicker than other regions, it follows that it will also have a greater heat capacity. It is therefore difficult for the heat the low stretched region possesses during the heat shrinking process in FIG. 4 to escape, so that this high temperature level will be carried over into the following secondary blow molding manufacturing step. In the blow molding manufacturing step regions which retain a large amount of heat will be easy to stretch. Therefore, if the cooling manufacturing step in FIG. 12 is not carried out the low stretched region 32 will stretch further than the bounds dictated by bottom 44 of the secondary blow molded article 40. Even if the low stretched region 32 is stretch during the secondary blow molding process the degree of stretched during this secondary process is small in comparison to that of the primary process. Because the low stretched region therefore expands into a comparatively large portion of the bottom 44 of the secondary blow molded article 40,the heat resistance of the raised portion 46 of the bottom 44 is low.

Figure 13C:
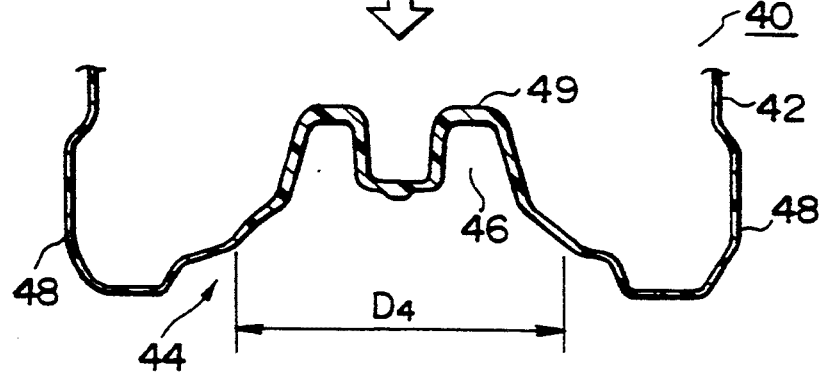

In this second embodiment, the low stretched region 32 of the heat shrunk molded article 30 is cooled by the cooling process shown in FIG. 12, so that it will become difficult to expand this region during the secondary blow molding process. This will result in the scope of the secondary low stretched region 49 formed in the bottom 44 of the secondary blow molded article 40 being quite narrow, as is shown in FIG. 13(c). Although the low stretched region 49 in FIG. 13(c) is stretched to a certain degree so that its diameter D4 is larger than the diameter D3 of the low stretched region 32 of the heat shrunk molded article 30, it is still narrow when compared to conventional containers. As a result of this, the heat resistance of the raised portion 46 of the secondary blow molded article 40 is improved.

When the secondary blow molded article 40 made according to the method in this second embodiment is filled with hot water, it was observed that downward movement of the peak of the raised portion 46 was reduced to a great extent. If this container is filled with high temperature sterilized contents and is drop tested, the peak of the raised portion 46 will protrude downwards upon impact, which makes direct contact with the floor and breakage problems will be avoided.

After the cooling manufacturing step shown in FIG. 12, the secondary blow molding manufacturing step according to the method in the first embodiment shown in FIG. 6 will be carried out. This means that the final molded product will acquire the improved heel buckling strength and retain of its self-supporting ability in the first embodiment.

It is not necessary for the pair of cairty halves 80a and 80b which make up the secondary blow cavity mold 80 to be clamped together for the cooling manufacturing step in the method in this second embodiment. In particular, for a comparatively long cooling time period the clamping could be timed to coincide with the end of the cooling time period. Accordingly it is not necessary to make the oil pressure driving time period for clamping as long as the cooling time period and the secondary blowing process movement time period.

Also, in the aforementioned cooling manufacturing step it is preferable for the bottom mold 80c to make contact at least with the low stretched region 26. To ensure that, it is advisable to stop the bottom mold 80c once at the midway point to the upper limit while extending the cooling time period.

The control for the vertical shrinking like the first embodiment will be essential in this second embodiment. To this end, the temperature adjustment of the preform 10 or the primary blow cavity mold 60 described in the first embodiment will also be effective in this second embodiment.

Third Embodiment

Figure 14:
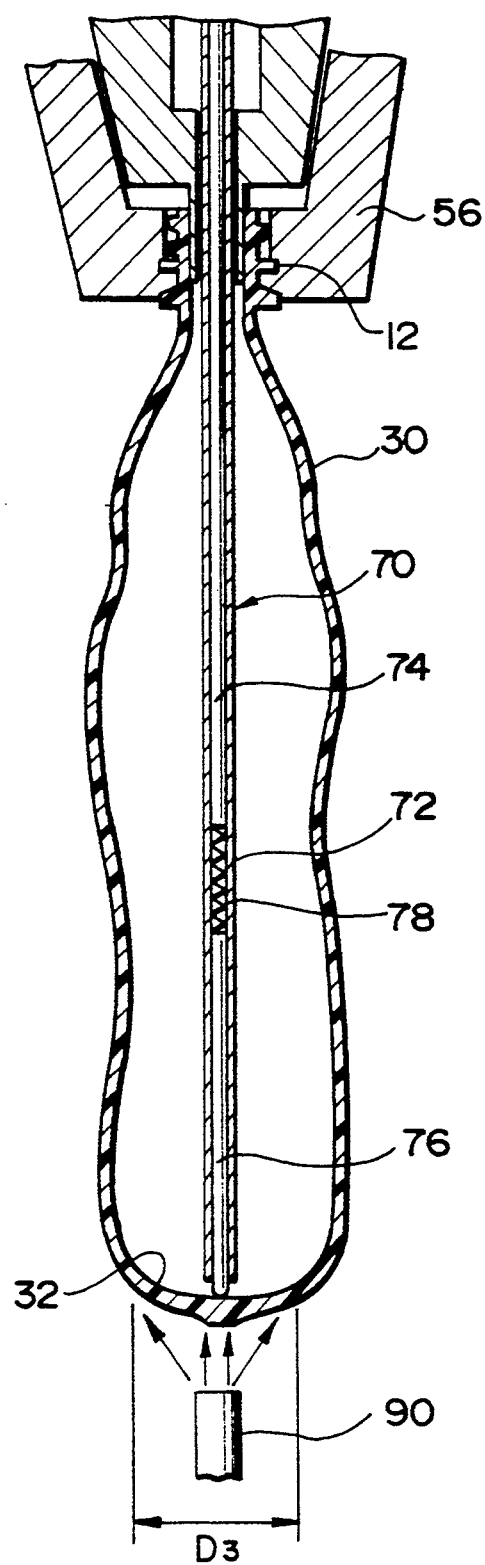
FIG. 14 is a fragmentary cross-sectional view of a cooling step in the manufacturing process for a third embodiment of the present invention.

In this third embodiment, the low stretched region of the heat shrunk molded article 30 undergoes a cooling manufacturing step either while being transferred to the secondary blow molding area or in a place just before entering it. In FIG. 14, from a coolant ejector pipe 90 which ejects a coolant or cooling medium such as air is arranged below the heat shrunk molded article 30 being transferred. A coolant such as air ejected from this pipe 90 can cool the low stretched region 32. One or a plurality of these coolant ejector pipes below the transfer path of the heat shrunk molded article 30 can be arranged based on the coolant temperature and cooling time period. A guide plate is also employed to ensure that the coolant is only directed onto the low stretched region 28.

The cooling of the low stretched region 32 is not simply limited to spray coolants. Direct contact with a cooling block (not shown in the diagrams) is also suitable. The direct contact cooling block method as the second embodiment would be possible to cool only lower stretched region 32. This vertically movable block could be placed in an area just before the heat shrunk molded article 30 enters the secondary blow molding area or a plurality of these raisable blocks could be arranged at intervals where the heat shrunk molded article 30 being stopped on its way to the secondary blow molding area.

Different from the first and second embodiments, the third embodiments does not necessarily require that the length of the heat shrunk molded article 30 is long enough to make contact with the bottom mold 80c. If a thick heel is desired, it is sufficient just to control the vertical shrinking of the primary blow molded article 20.

What is claimed is:

1. A method of molding a heat resistant container, the heat resistant container including a body part, a bottom part formed at a first axial end of the heat resistant container, and a heel part connecting the bottom part to the body part, the bottom part having a raised part extending inwardly toward a second axial end of the heat resistant container, the raised part having a central part formed in a center of the raised part and an edge part surrounding said central part, the edge part connecting the central part to the heel part, the method comprising the steps of:

(a) primary blow molding an injection molded preform into a primary blow molded article in a primary blow cavity mold, the primary blow molded article being axially longer than the heat resistant container, the primary blow molded article having a less-stretched region;

(b) heat shrinking the primary blow molded article into a heat shrunk primary blow molded article, an axial length of the heat shrunk primary blow molded article being greater than an axial length of the heat resistant container, the axial length of the heat shrunk primary blow molded article being measured from a top of the heat shrunk primary blow molded article to a bottom center of the heat shrunk primary blow molded article, the axial length of the heat resistant container being measured from a top of the heat resistant container to a peak of the raised part of the heat resistant container;

(c) inwardly forming the central part of the raised part in said less-stretched region in a secondary blow cavity mold by moving a bottom mold in a vertical direction, the central part contacting the bottom mold without an area corresponding to the edge part of the raised part contacting the bottom mold when the bottom mold stops moving in the vertical direction; and (d) after said forming step, secondary blow molding the heat shrunk primary blow molded article into the heat resistant container within the secondary blow cavity mold, wherein said heel part and said edge part each have a desired wall thickness thinner than a wall thickness of the central part of the raised part, and the less-stretched region becomes limited to the central part of the raised part, the less-stretched region having a lower stretch ratio than a stretch ratio of the body part of the heat resistant container.

2. The heat resistant container molding method of claim 1, wherein said heat shrinking step includes inserting a rod into the primary blow molded article until a distal end of the rod contacts an inside wall of the bottom of the heat shrunk primary blow molded article at an area corresponding to the central part of the raised part, the rod restricting shrinking of the heat shrunk primary blow molded article in a longitudinal direction.

3. The heat resistant container molding method of claim 2, wherein a spring urges the distal end of said rod toward the bottom of the heat shrunk primary blow molded article.

4. The heat resistant container molding method of claim 3, wherein said rod as a centering rod for the heat shrunk primary blow molded article in said secondary blow molding step.

5. The heat resistant container molding method of claim 2, wherein said heat shrinking step includes sealing an opening of the primary blow molded article at an area corresponding to the second axial end of the heat resistant container and increasing an internal pressure of the primary blow molded article, the internal pressure and said rod restricting heat shrinkage of the primary blow molded article.

6. The heat resistant container molding method of claim 1, further comprising the step of controlling a surface temperature of said preform before said primary blow molding step, the surface temperature controlled to a temperature within a range of 85° C. to 100° C., the controlled surface temperature reducing shrinkage in a vertical direction of said primary blow molded article during said heat shrinking step.

7. The heat resistant container molding method of claim 6, wherein said heat shrinking step includes inserting a rod into the primary blow molded article to restrict the primary blow molded article from shrinking in a longitudinal direction, sealing an opening of the primary blow molded article at an area corresponding to the second axial end of the heat resistant container, increasing an internal pressure of the primary blow molded article and restricting heat shrinkage of the primary blow molded article using said internal pressure and said rod.

8. The heat resistant container molding method of claim 1, wherein said primary blow cavity mold includes heating means for controlling a temperature of said primary blow molded article, the temperature controlled to be within a range of 70° C. to 80° C., said controlled temperature reducing shrinking in a vertical direction of said primary blow molded article during said heat shrinking step.

9. The heat resistant container molding method of claim 8, wherein said heat shrinking step includes inserting a rod into the primary blow molded article to restrict shrinking in a longitudinal direction, sealing an opening of the primary blow molded article at an area corresponding to the second axial end of the heat resistant container, increasing an internal pressure of the primary blow molded article and restricting heat shrinkage of the primary blow molded article using said internal pressure and said rod.

10. The heat resistant container molding method of claim 1, wherein a length of said heat shrunk primary blow molded article from the top of said heat shrunk primary blow molded article to the bottom center of said heat shrunk primary blow molded article is shorter than a length of the heat resistant container from a top of the heat resistant container to said grounding part of the heat resistant container.

* * * * *